Aug. 1, 1967 J. E. LARSEN 3,333,327

METHOD OF INTRODUCING ELECTRICAL CONDUCTORS INTO CONDUCTOR ACCOMMODATING STRUCTURE

Filed Nov. 30, 1964

8 Sheets-Sheet 1

INVENTOR.
John E. Larsen,
BY John M. Stoudt
Attorney.

Aug. 1, 1967 J. E. LARSEN 3,333,327
METHOD OF INTRODUCING ELECTRICAL CONDUCTORS INTO CONDUCTOR ACCOMMODATING STRUCTURE
Filed Nov. 30, 1964
8 Sheets-Sheet 2
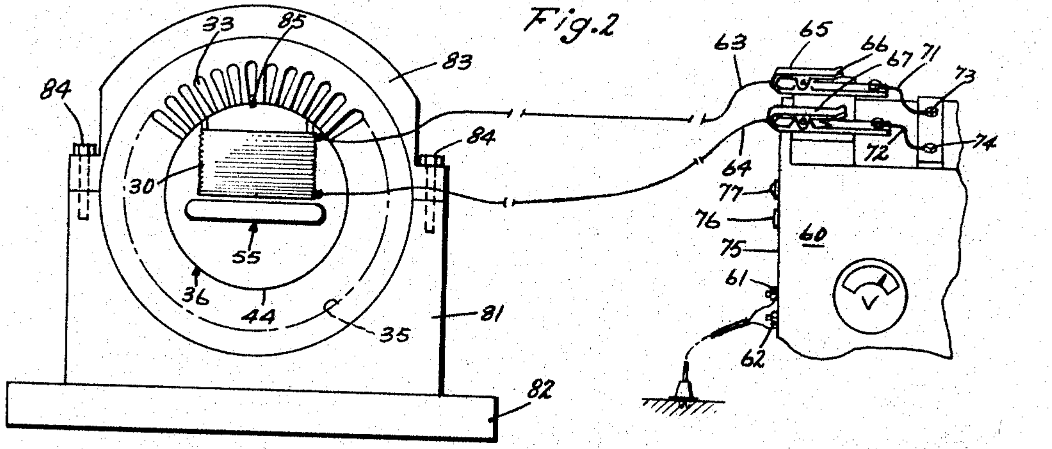
Fig.3
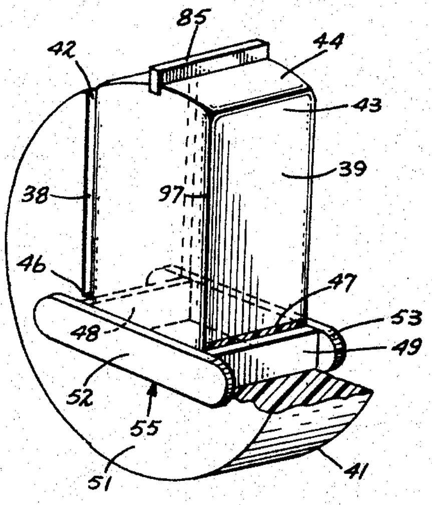
Fig.4
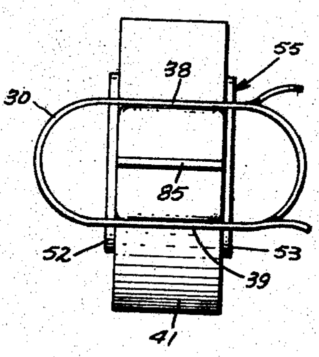
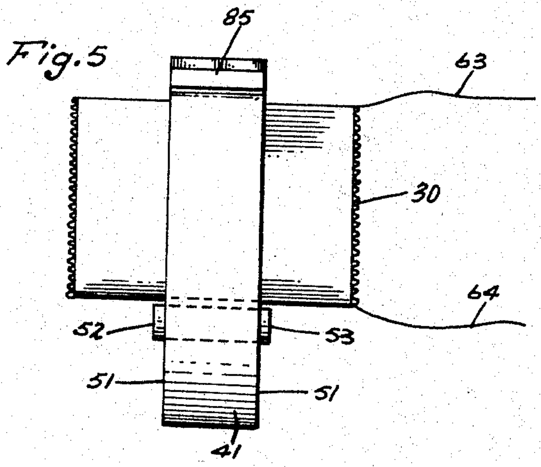
INVENTOR.
John E. Larsen,
BY John M. Stoudt
Attorney.

INVENTOR.
John E. Larsen,
by John M. Stoudt
Attorney.

INVENTOR.
John E. Larsen,
BY John M. Stoudt
Attorney.

INVENTOR.
John E. Larsen,
by John M. Stoudt
Attorney.

INVENTOR.
John E. Larsen,
BY John M. Stoudt
Attorney.

INVENTOR.
John E. Larsen,
BY John M. Stoudt
Attorney.

INVENTOR.
John E. Larsen,
BY John M. Stoudt
Attorney.

United States Patent Office 3,333,327

Patented Aug. 1, 1967

3,333,327

METHOD OF INTRODUCING ELECTRICAL CONDUCTORS INTO CONDUCTOR ACCOMMODATING STRUCTURE

John E. Larsen, Fort Wayne, Ind., assignor to General Electric Company, a corporation of New York Filed Nov. 30, 1964, Ser. No. 414,822
10 Claims. (Cl. 29—596)

The present invention relates generally to an improved method of introducing electrical conductors into conductor accommodating structure and to apparatus for achieving such introduction. The present invention is particularly suitable for accomplishing the insertion of a preselected number of flexible wire conductor turns or convolutions into the slots of magnetic cores of electrical inductive devices, such as transformers, dynamoelectric machines, and the like, and for developing the convolutions into coils each having a desired contour or configuration.

In the construction of certain electrical inductive devices, electrical coils wound from successive turns of individually insulated wire conductors are normally accommodated in suitable slotted structures, such as slotted cores formed of magnetic material. For example, dynamoelectric machine stators, especially those incorporated in small and fractional horsepower electric motors, are conventionally provided with magnetic cores having a series of slots extending axially between the end faces of the core. These slots customarily have dimensionally restricted entrances in communication with a so-called rotor receiving bore which also projects between the core end faces.

In the manufacture of the stators, one of the more attractive and generally accepted approaches employs mechanical apparatus, part of which is disposed in the bore, to insert pre-formed coils from the bore through the restricted slot entrances and into the slots. Thereafter, the apparatus forces the coil side portions accommodated in the slots radially away from the bore and toward the bottom walls of the slots by pressure engagement with the coil side portions. The end turn portions of the coils, projecting axially beyond the confines of the slots, are also forced away from the bore by mechanical means. Unfortunately, this general approach has not been entirely satisfactory for one reason or another. For instance, during the insertion of the coil side portions through the restricted slot entrances, the wall edges of the slots at that location have a tendency to nick or otherwise damage the insulation covering the wire conductors or the conductors themselves which may result in electrical short circuits and premature winding failure. Moreover, as the coil side and end turn portions are being pushed away from the bore, parts of the apparatus which engage the coils to effect this action have a tendency of causing damage to the insulation by nicking or chipping off the insulation and may even cut or otherwise adversely affect the wire conductors. In addition, it has been found that there is a practical upper limitation on the cross section area and volume of the wire conductors which can be inserted through the restricted slot entrances, regardless of the magnitude of the applied forces involved. Furthermore, these procedures utilizing mechanical mechanisms located in the bore have been inherently restricted as to the type of core with which they can be advantageously practiced and are expensive to employ.

Accordingly, it is a general object of the present invention to provide an improved method of introducing electrical conductors into conductor accommodating structure.

It is another and more specific object of the present invention to provide an improved method for inserting a portion of a number of flexible wire conductor convolutions into the slots of magnetic cores for use in electrical inductive devices and for developing the conductor convolutions into electrical coils more efficiently and economically than prior methods.

It is still a further object of the present invention to provide an improved method for inserting a portion of a number of insulated wire conductor convolutions into slots of dynamoelectric machine cores and for developing the convolutions into compacted electrical coils in a manner which overcomes the disadvantages mentioned above in connection with prior practices.

In carrying out the objects of the present invention in one form, I provide an improved method for introducing individually movable portions of a number of electrically conductive convolutions into the slots of a slotted structure, such as a dynamoelectric machine magnetic core, and for developing the convolutions into a coil. The convolution portions are arranged in initial positions adjacent the entrances of preselected slots of the structure and near a rigid electrically conductive winding. An electrical surge of energy of predetermined intensity is generated in the rigid winding and an opposing reaction is produced between the winding and the convolution portions such that a repulsion force acts upon the portions. The winding thereby imparts momentum to the convolution portions in the direction of the preselected slots. The portions are guided into the preselected slots and some of them make impact with the slot walls located away from the entrances, and are restrained within the slots with the convolutions being developed into compact coils.

As will be evident from the preceding summary, the present invention provides an improved efficient and economical development of conductor convolutions into electrical coils without the need for expensive equipment. Furthermore in the practice of my invention, the conductor insulation is not deleteriously affected while at the same time, a coil is provided with the desired compactness and contour. Other features and advantages will become manifest from the following description.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings where:

FIG. 1 is a schematic presentation in perspective depicting an embodiment of the method of the present invention as applied to the introduction of a number of electrical conductor convolutions into a slotted structure, a dynamoelectric machine stator core, by way of exemplification, and to the development of the convolutions into a compacted coil having a desired configuration, the view showing circuit connection of the convolutions to a power or energy supply suitable for generating electrical energy surges in the convolutions to carry out my improved method;

FIG. 2 is an end view, detailing part of a dynamoelectric machine stator core adapted to accommodate a distributed type main winding and apparatus including a convolution ejecting device, which is capable of carrying out the method, the view revealing the components preparatory to the introduction of selected portions of the convolutions into preselected core slots;

FIG. 3 is a view in perspective, partly broken away, illustrating internal structural details of the convolution ejecting device seen in FIG. 2;

FIG. 4 is a plan view of the convolution ejecting device and the electrical conductor convolutions before being arranged in the position relative to the stator core seen in FIG. 2;

FIG. 5 is a side view of the device displayed in FIG. 4;

Figures 6, 7, 8:
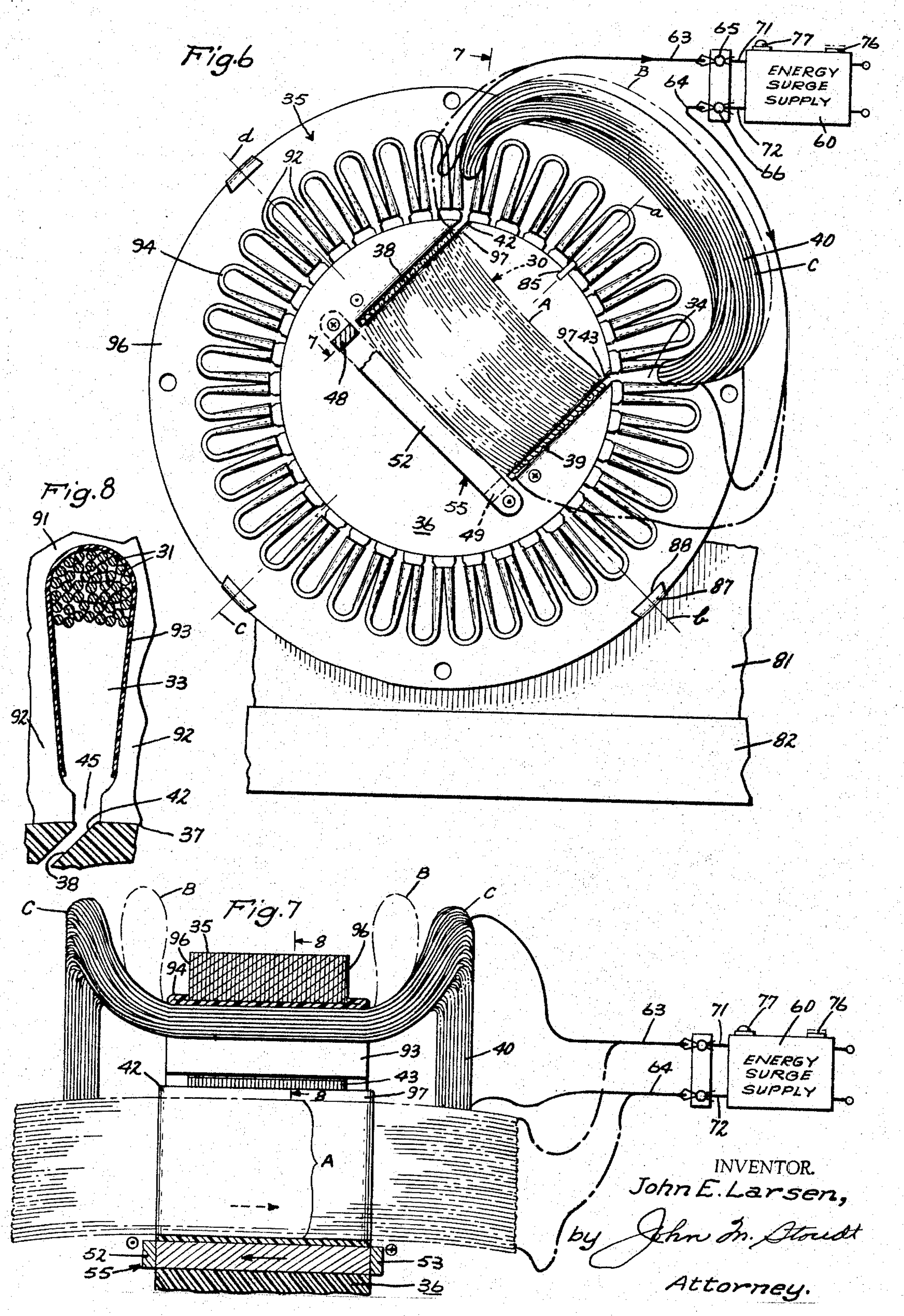
FIG. 6 is an enlarged end elevational view of the stator core and conductor convolution ejecting device illustrated in FIG. 2, showing the development of the outermost coil in a concentric type coil group of a single polar region for the stator core of the exemplification.
FIG. 7 is a view taken along line 7—7 in FIG. 6; the view portraying the step by step development of the conductor convolutions into the finished coil in accordance with the method of the present invention.
FIG. 8 is an enlarged partial view taken along line 8—8 in FIG. 7 to reveal the relative final positions of the conductor portions in the slots after the convolutions have been developed into a coil.
Figure 9:
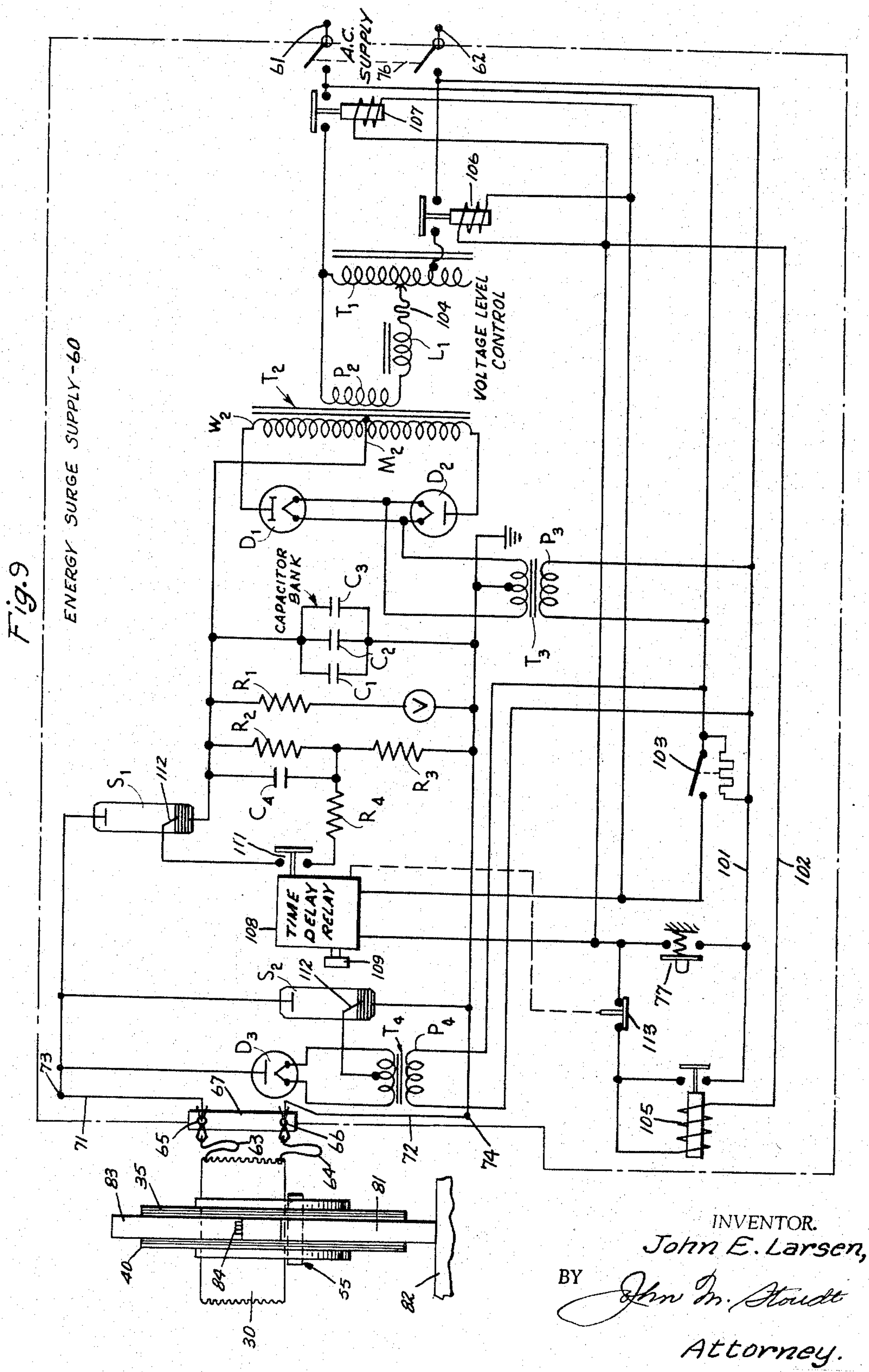
FIG. 9 is a side elevational view of the apparatus and stator core shown in FIG. 2, with the energy surge supply component of the apparatus being presented diagrammatically in circuit form.
Figures 19, 20:
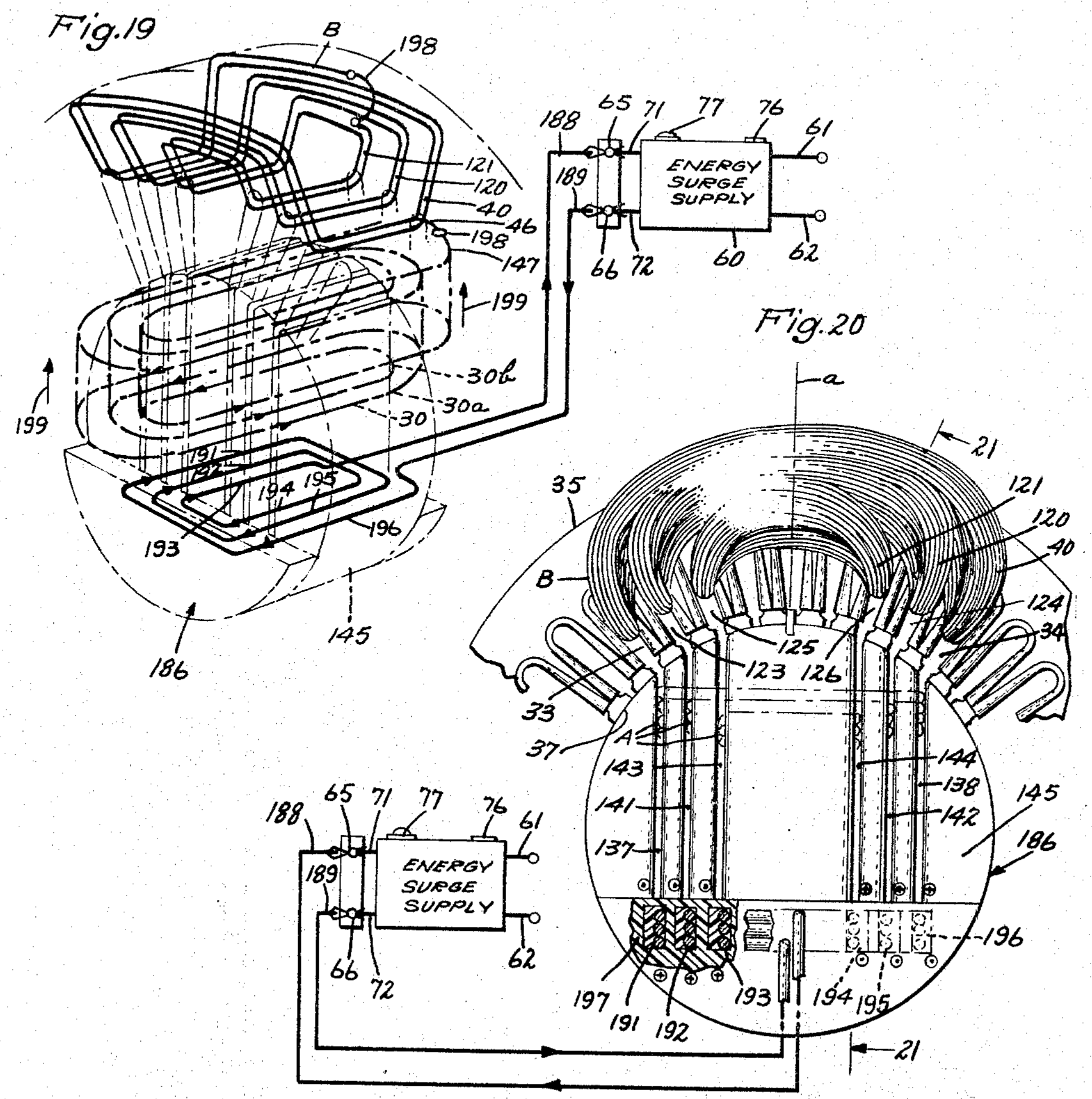
FIG. 19 is a schematic view in perspective depicting still another embodiment of the method of the present invention for generating a surge of electrical energy in electrical conductor convolutions disposed outside preselected slots of a slotted structure, such as a stator core, and their introduction into the slots and subsequent development into the desired coil configuration.
Figure 21:
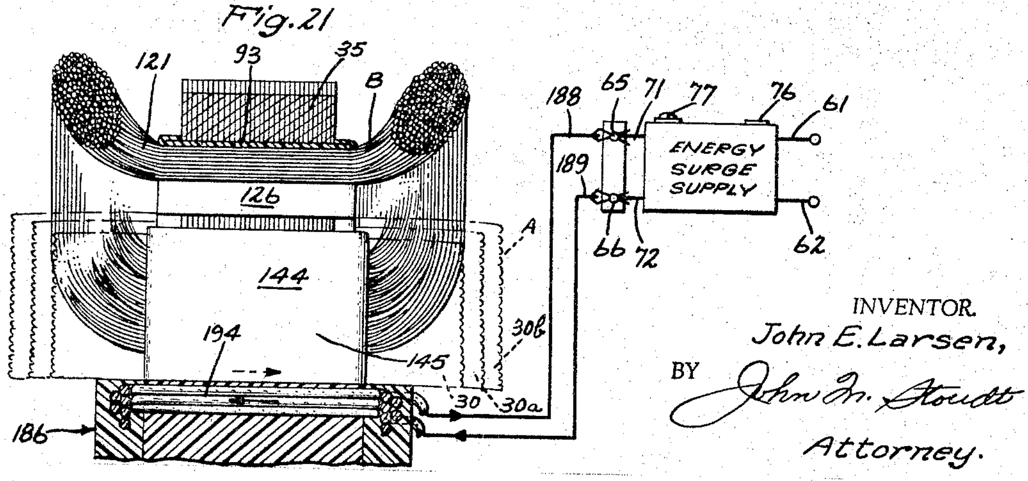

FIG. 20 is an end elevational view of another form of apparatus which may be employed to carry out the embodiment of the method schematically portrayed in FIG. 9, the view showing the apparatus concurrently forming an entire concentric coil group in the stator core exemplification best seen in FIG. 7; and FIG. 21 is a view taken along line 21—21 in FIG. 20 to reveal the introduction and development of convolutions into finished coils achieved by the apparatus of this embodiment.

In order to disclose the principles of my invention, various aspects of the invention are illustrated in FIGS. 1–9 as being applied to a number of electrically insulated conductor convolutions 30 having portions 31, 32 introduced into preselected coil accommodating slots 33, 34 of a stator core 35 and developed into an electrical coil 40 of a desired overall contour or configuration. Coil 40 in the exemplification is part of a distributed type main excitation winding to be discussed more completely hereinafter. For the purpose of explanation, one form of my method is described below in connection with novel apparatus which may be utilized to carry out the method.

Figure 1:
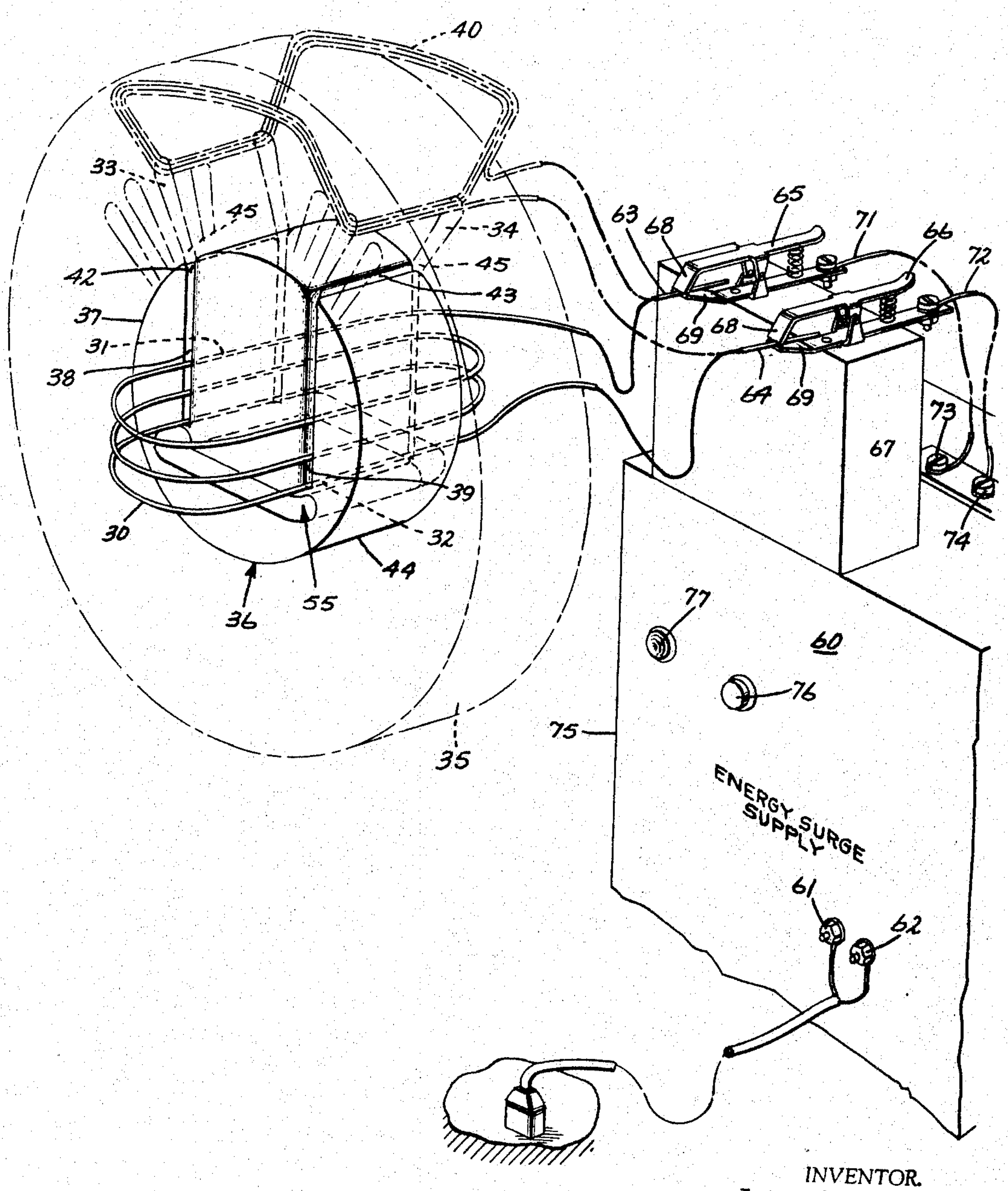

Referring nows to FIGS. 1 and 2 in particular, the apparatus as shown includes a convolution ejector device, generally indicated by numeral 36 and arranged in the cylindrically shaped control bore 37 of stator core 35. The device has a pair of separated channels 38, 39 formed entirely through a hardened thermoresponsive body member 41 in an axial direction. In the illustrated form, member 41 is composed of thermosetting epoxy resin or the like. The channels serve to retain or confine convolution portions 31 and 32 at initial predetermined positions near the preselected slots 33, 34. The outermost ends or upper regions 42, 43 of the channels 38, 39 (as viewed in the drawings) are open at the circumferential surface 44 of member 41, which is complementary in shape to bore 37. Channel regions 42, 43 are maintained in aligned communication with the respective entrances 45 of preselected slots 33, 34 and define confined passageways or paths for guiding the convolution portions 31, 32 into their preselected slots.

As better seen in FIG. 3, directly below and preferably adjacent to the bottom walls 46, 47 of the convolution channels, member 41 fixedly carries electrically conductive axial or side sections 48, 49 in the form of conductor bars which are electrically joined together as by welding or the like, at each end face 51 of member 41 by electrically conductive transverse sections 52, 53 to form a short-circuited non-magnetic winding generally identified by numeral 55. The winding may be fabricated in any suitable shape and may be fabricated from copper, aluminum or other suitable conductive material. A closed path is formed by the shorted winding for conducting induced current flow to assist in the ejection of convolution portions 31, 32 from channels 38, 39 in a manner to be detailed more completely below.

As shown in FIGS. 1, 2 and 9, the apparatus also has a power impulse or electrical energy surge supply 60 capable of generating a preselected surge of energy in convolutions 30. Input terminals 61, 62 of the supply are adapted for connection to an alternating current source. In actual practice, this connection consisted of a plug for use with a grounded receptacle of a commercially available 120 volt, 60 cycle power source. In the first exemplification, the terminations 63, 64 of convolutions 30 are serially connected across supply 60 through a pair of supply output terminal connectors 65, 66 mounted on an insulated support 67. The illustrated connectors 65, 66 are identical in construction, each being a clamping element having two serrated jaws 68, 69 biased toward one another. The serrations cut through the convolution insulation to make a good electrical connection with the conducting material of convolution terminations 63, 64. Leads 71 and 72, in turn, connect the output terminal connectors 65 through intermediate terminal posts 73, 74 in the supply circuit.

The components for the energy surge supply 60 are housed within a cabinet or casing 75 which also mounts connector support 67, terminal posts 73, 74, a main off-on switch 76 for initially activating certain components of the supply, and a pushbutton switch 77 for operating the supply.

Before turning to a consideration of the step by step coil developing procedure of the first exemplification, it will be understood by those skilled in the art that any suitable means may be used in establishing a fixed predetermined relation between the preselected slots of the slotted coil accommodating structure and the structure which initially retains the convolutions. Thus, merely by way of illustration (FIGS. 2 and 9) in the exemplification, stator core 35 is rigidly held in an upright cradle support 81, mounted on a base plate 82, by a clamping element 83 removably attached to the support 81 by bolts 84. Further, as better seen in FIGS. 3 and 4, device 36 is furnished with a key 85 attached to member 41 at its outer surface 44, adapted to fit into an entrance of one of the core slots other than preselected slots 33, 34. Consequently, the key and slot arrangement maintain alignment of the upper regions 42, 43 of channels 38, 39 with the entrances 43 of preselected slots 33, 34 as device 35 is being the bore of the core by engagement between complementary circumferential surface 44 of member 41 and the core.

In considering the manner in which the aforedescribed apparatus is utilized to carry out one form of my method in the first exemplification, FIGURES 6, 7, 8, and 9 should be consulted. Stator core 35 in the illustrated form is fabricated from a number of stacked laminations secured together by a plurality of conventional keys 87 frictionally received in grooves 88 which extend transversely across the outer periphery of the core. The stator core is formed by a yoke section 91 and a number of tooth sections 92 which defined a corresponding number of slots between adjacent teeth sections. The radially inner ends of the teeth sections are enlarged to provide the restricted slot entrances 45 and the stator bore 37. There are thirty-six such slots in the illustrated exemplification which are adapted to carry four coil groups with three coils in each group somewhat concentrically disposed around radial pole centers, *a*, *b*, *c*, and *d* respectively seen in FIG. 8. Generally U-shaped standard insulating slot liners 93 having cuffed ends 94 are carried in each slot for insulating the coils from the slot walls. Merely for the purpose of disclosing one form of my invention, convolutions 30 are positioned to form coil 31, the outermost coil in the coil group having a radial center at *a*.

FIGS. 6 and 7 show upper regions 42, 43 of channels 38, 39 and entrances 45 of preselected slots in aligned relation and convolutions 30 retained in the initial positions A already described and shown in phantom, preparatory to their development into coil 31 having the desired configuration.

It should be recognized that the axial length of convolutions 30 when in positions A must be adequate to allow for the proper formation of the end turns of coil 40. In addition, convolution terminations 63, 64 of coil 40 are serially connected to energy surge supply 60 across supply output terminals 63, 64 and main switch 76 is in the "on" position when in initial positions A. In carrying out one form of the method of the present invention to coil 40 of the exemplification, an electrical energy surge of preselected magnitude is generated in convolutions 30 as they are being retained in their initial positions A. This is accomplished by depressing the pushbutton of switch 77 which actuates a circuit for charging a capacitor bank to a particular voltage level, regulated by a control autotransformer. Thereafter, the capacitor bank is discharged and the energy surge is directed into convolutions 30 of preselected magnitude through output terminal connectors 65, 66 and convolution terminations 63, 64. The magnitude must be below the intensity which deleteriously affects the insulation covering the convolutions yet sufficiently high to develop the convolutions in a coil.

By way of example, fourteen convolutions formed of enameled aluminum wire had a bare wire nominal diameter of 0.048 inch, a total insulated nominal diameter of 0.051 inch, and insulated by an adherent coating of polyvinyl formal resin. The preselected energy surge had a magnitude of 307.5 joules. To obtain joules of energy, the capacitor bank used had three capacitors connected in parallel (see FIGURE 9) with each capacitor having a capacitance rating of 210 microfarads to furnish a nominal capacitance for the bank of 630 microfarads and was changed to a selected voltage in accordance with the expression $E=\frac{1}{2}CV^2$ where:

$E$=desired energy in joules
$C$=capacitance of capacitor bank in farads
$V$=selected voltage in the bank in volts Consequently, the selected voltage level was approximately 1000 volts.

Still referring to FIGS. 6 and 7, the application of the energy surge to the convolutions 30 produces a surge of current flow in the same direction through the individual convolutions, and as I understand the action, an opposing transient eddy current flow is induced in the short-circuited winding 55 fixedly carried by member 41 as indicated by the arrows and standard symbols ⊙ and ⊕. The former symbol indicates a direction of flow toward the viewer while the latter one is indicative of a flow away from the observer and into the drawing. It is believed that the opposed current flow in convolution side portions 31, 32 and the respective adjacent conductive sections 48, 49 of the rigid winding 55 creates opposed electromagnetic fields which establish forces acting upon the convolution side portions to repel or reject the side portions from channels 38, 39, and transfer them into slots 33, 34.

More specifically, the forces impart momentum to the convolutions and rapidly transfer the convolution side portions 33, 34 away from rigid winding sections 48, 49, and through the confined paths established by the upper regions 42, 43 of the channels which guide the convolution portions in a single line or row into slots 33, 34 through their restricted entrances 45. The convolution side portions ultimately make impact with the bottom of the walls (including the wall insulation) of the preselected slots, disposed away from their entrances 45, which restrain further radial movement of the convolution side portions away from their initial positions. This sudden deceleration of the convolution side portions helps to compact them into a small volume as seen in FIG. 8. However, the convolution portions projecting axially outward from the ends of the slots continue their movement radially beyond the side portions and axially toward the associated end face 96 of the stator core 35, positions B shown in FIGS. 6 and 7 by the broken lines. In actual practice the transition of the convolutions from positions A to B has been accomplished in a little over one hundred microseconds. It is believed that during the development, the magnetic core assists in the transfer of the convolutions by providing a positive flux path across the teeth sections and slots before saturation of the core which is greater in density at the slot entrances 45 than at the bottom of the slots. In addition, after saturation, the surge in the individual convolutions causes mutual attraction of the convolutions after side portions 31, 32 enter the slots thereby causing compaction of the convolutions into a compact bundle.

In this way, the convolutions 30 are developed into a somewhat compact bundle, both within and outside slots 33, 34, to define the electrical coil 40. As seen from FIG. 8, which illustrates a cross section of slot 33 and is representative of slot 34, the individual convolutions are in a compact mass. However, for many applications, the end turns of coil 40 are disposed too close to core end face 96. Consequently, a second preselected surge of energy may be applied to the convolutions for transferring the coil end turns to positions C illustrated in full to provide coil 40 with the desired overall configuration. For the enameled aluminum wire example previously given, the second surge was identical in magnitude to the first one; i.e., 307.5 joules, and achieved transfer of the coil end turns from positions B to C. At the same time, the high degree of compaction of the coil achieved by the first surge, was retained. Results were completely satisfactory and the wire insulation was not deleteriously affected.

Of course, if desired, rather than the second energy surge, a shaping die (not shown), having a shaping surface of suitable contour maintained at position C, should be used so that the end turns are forced against the die surface and consequently contoured as desired.

It has been found that in order to derive the maximum benefits with the apparatus illustrated in the first exemplification, winding side sections 48, 49 should be generally parallel to channels 38, 39 and arranged as near to the bottom walls of the respective channels as possible and still be electrically insulated from convolutions 30. In addition, the end sections 52, 53 should not be located substantially beyond the axial terminations of the preselected slots so as not to create forces on the convolution portions extending beyond channels 38, 39 which could force the portions prematurely in an axial direction against the end faces of either member 41 of device 36 or of the stator core 35 thereby interfering with the proper development of the coil. For best convolution transfer results by the illustrated device 36, it has also been discovered in actual practice that the channels should retain convolutions in a single row, with the width of the channel being slightly greater than the total diameter of or largest transverse dimension across a single convolution but less than twice the single convolution diameter. Further, the outermost regions 42, 43 of the channels should be slightly less in width than the width of the slot entrance. For instance, with the example aluminum wire of 0.051 inch diameter and a slot entrance width of 0.093 inch, a channel width of 0.064 inch was completely satisfactory. Curving or beveling the radial edge of the channels at the end face of member 41 disposed toward each other as indicated at 97 in FIG. 3 and forming the channels parallel to radial center A of the poles also facilitate a smooth transfer of the convolutions.

It will be obvious to those skilled in the art that the total number of surges to be employed and the preselected surge magnitude chosen for a given application to produce a level of force sufficiently large to effect the desired development are dependent upon such factors as: convolution size, total length, resistance, and type of insulation; final coil configuration desired; details of the magnetic core; and other variables.

FIGURE 9 illustrates simplified circuit diagram of one type of electrical energy surge supply which has been incorporated in my apparatus in the practice of the present invention. This supply is identified by the legend "energy surge supply" and numeral 60 in the various figures. By way of illustration, the supply includes a bank of three parallel connected storage capacitors $C_1$, $C_2$, and $C_3$, chargeable as a unit to various regulated voltage levels between 500 and 4000 volts which are subsequently discharged to provide a high electrical energy surge of preselected magnitude by switching an ignitron $S_1$ into conduction.

As mentioned before, the components of the supply circuit are housed in casing 75 shown in FIGS. 1 and 2 and main on-off switch 76 of standard construction, mounted to the casing 75, initially energizes certain components of the circuit. With main switch 76 in the closed position, primary windings $P_3$, $P_4$ of the filament transformers $T_3$, $T_4$ are immediately activated. It will also be seen that the circuit, which includes pushbutton switch 77 and leads 101, 102, is not originally energized until after an interval of time as determined by thermostatic time delay switch 103. In this way, the grids of the rectifier tubes $D_1$, $D_2$, and $D_3$ are allowed to warm up for at least 30 seconds before plate voltage is applied to the rectifier tubes, which are of the liquid vapor type, necessitating the warm-up period.

In order to regulate the voltage level on the bank of capacitors $C_1$, $C_2$, and $C_3$ (see the appropriate legends in FIG. 9), adjustable arm 104 of the control autotransformer $T_1$ is movable for regulating the voltage to the desired level. In the application of this energy supply to my invention, the magnitude of the high energy surge may be readily selected by controlling or regulating the voltage level to which the capacitors $C_1$, $C_2$, and $C_3$ are charged.

As previously noted, the charging of the capacitor bank is initiated by depression of pushbutton switch 77. This momentary closing of switch 77 causes the normally open relay 105 to close, whereupon the coils of the two normally closed relays 106 and 107 are also energized supplying alternating current across the autotransformer $T_1$. When relay 104 closes, time delay relay 108 is also actuated and after a time delay determined by the setting on the control 109, relay 111 is operated to provide a positive potential applied at starter rod 112 of ignitron $S_1$ which is then switched to a conductive state. Ignitrons $S_1$ and $S_2$ illustrated in the circuit are mercury-pool cathode-arc rectifiers with a starter rod 112 immersed in the mercury pool when a positive potential is supplied at the starter rod of the ignitrons, sparking occurs at the junction of the rod and mercury pool causing the formation of a cathode spot, with the anode passing current in the usual way.

With ignitron $S_1$ in a conductive state, time delay relay 108 momentarily opens contacts 113 to restore relays 105, 106, and 107 to their normally open positions after an interval of time. The illustrated time delay relay is of the commercially available type, being driven by a small synchronous motor coupled to a gear train. At the termination of the time delay interval, the contacts of a microswitch close and energize relay 111.

It should be noted at this time that when time delay relay 108 and control autotransformer $T_1$ have been energized, the output of the control autotransformer is applied across the primary winding $P_2$ of step-up autotransformer $T_2$. To limit the peak current, a choke $L_1$ is connected in series with primary winding $P_2$. To furnish a full wave rectified current for charging the capacitors $C_1$, $C_2$ and $C_3$, the pair of high voltage rectifiers $D_1$ and $D_2$ are connected in the secondary circuit of step-up transformer $T_2$.

The secondary winding $W_2$ is in turn tapped at its center tap $M_2$ so that the voltages between each end of the secondary winding $W_2$ is of such polarity that its upper end is positive with respect to the center tap $M_2$, the plate of the high voltage rectifier $D_1$ becomes positive with respect to its cathode. The rectifiers $D_1$ and $D_2$ alternately conduct in conformance with the changing polarity of the input voltage. By connecting a voltmeter V in series with a multiplier resistor $R_1$ across the bank of capacitors, a voltage reading may readily be taken of the voltage level on the capacitor bank.

The full wave rectified output is additionally utilized for the purpose of charging a capacitor $C_4$ through a voltage divider consisting of resistors $R_2$ and $R_3$. Approximately four-tenths of the full wave rectified voltage is applied across the capacitor $C_4$. A resistor $R_4$ is connected in the discharge circuit of the capacitor $C_4$ to control its discharge rate when the relay 111 is actuated to the closed position.

By way of a more specific illustrative example of energy surge supply 60, the following identified components have been incorporated on the aforedescribed circuit in FIG. 9 of apparatus constructed and used in accordance with the principles of my invention:

| Component identification: | Specification of the components |
|---|---|
| Control autotransformer $T_1$ | General Electric 9H60LA10X. |
| Step-up transformer $T_2$ | Stancor P–8034. |
| Choke $L_1$ | Stancor C–2688, –010 henries. |
| Rectifiers $D_1$, $D_2$, $D_3$ | Mercury vapor rectifiers 872A. |
| Filament transformer $T_3$ | Stancor 5 volt, 15 amperes P–6433. |
| Filament transformer $T_4$ | Stancor 5 volt, 10 amperes P–6135. |
| Ignitrons $S_1$, $S_2$ | GL5550 ignitron. |
| Capacitors $C_1$, $C_2$, $C_3$ | 210 microfarads, 500 volts. |
| Capacitor $C_4$ | .05 microfarads, 2000 volts |
| Resistor $R_1$ | 5 megohms. |
| Resistor $R_2$ | 2 megohms. |
| Resistor $R_3$ | 3 megohms. |
| Resistor $R_4$ | 20 megohms. |

It will be recognized by those skilled in the art, of course, that other kinds of electrical energy surge supplies may be utilized in the practice of the present invention. However, whatever the energy supply, it should be capable of generating at least one high surge of electrical energy having a preselected magnitude in a number of convolutions as controlled by the given application, previously discussed.

Turning now to a brief description of the way in which the foregoing described energy supply of FIG. 9 has been utilized in the practice of my invention, the adjustable arm 104 on the control auto transformer $T_1$ is initially set to provide a selected voltage between the center point $M_2$ and one end of the secondary winding $W_2$ of the step-up transformer $T_2$. For a bank of three capacitors $C_1$, $C_2$, $C_3$ each having the rated capacitance of 210 microfarads in the example previously given and a preselected surge of electrical energy of 307.5 joules is desired for developing convolutions into coils in the core of the exemplification, arm 104 of the voltage level control should be set to charge the bank with the selected voltage of approximately 1000 volts. With main switch 76 closed and the filament transformers energized for an interval of approximately thirty seconds, the grids of the high voltage rectifiers become warmed up. The time delay switch 108 closes, supplying power to leads 101 and 102. The circuit is not in stand-by condition, and the capacitor bank can be charged by the operator at his discretion by depression of the button for switch 77.

Once the capacitors $C_1$, $C_2$ and $C_3$ have been charged to the selected voltage level and the 15 second time delay period has terminated, relay 111 causes the capacitor $C_4$ to discharge through the starter rod 112 of ignitron $S_1$. When the ignitron has been triggered into a conductive condition, it functions as a switch and discharges the capacitor bank ($C_1$, $C_2$, $C_3$) which directs the preselected energy surge to the illustrated convolutions 30 through leads 71, 72, and terminal connectors 65 and 66.

When the polarity of the voltage across the terminal connectors 65, 66 reverses, the voltage on the plate of the high voltage rectifier $D_3$ becomes positive, and it is also triggered into conduction. With the rectifier $D_3$ conducting, a positive potential is applied at the starter rod 112 of ignitron $S_2$, which subsequently fires. Consequently, the reverse current flow shunts the capacitor bank.

If successive high energy surges are desired, the adjustable arm 104 on the control autotransformer $T_1$ may be moved to regulate the selected voltage level on the capacitor bank which will give a surge of preselected magnitude. If a time delay interval of greater duration is required than that used for the first surge, time delay control 109 can be adjusted to provide a time interval corresponding to the new voltage level. Pushbutton switch 77 is once again depressed and the capacitors $C_1$, $C_2$, and $C_3$ of the capacitor bank are charged and finally discharged after a prescribed time interval to direct a second high electrical energy surge through the convolutions. This cycle of operation may be repeated as often as desired for each subsequent surge of energy.

It will be appreciated that in regard to the application of my invention to the introduction of a predetermined number of electrical convolutions into the slots of a magnetic core and develop the convolutions into a coil, it is possible to attain the desired coil configuration, including compaction and contour, in a rapid and efficient manner. There is no need for heavy and expensive mechanical apparatus which insert electrical coils by physically contacting and pushing the coils, thus providing economy in the apparatus required. Further, there is no tendency to adversely affect the insulation by the method of my invention, thereby saving or reducing potential manufacturing rejects for this reason. Other advantages of the method of the invention are its versatility and degree of compaction which may be attained for the developed coil. These features and advantages, as well as others, will be seen more clearly in the remaining part of this description.

Figures 10, 11, 13:
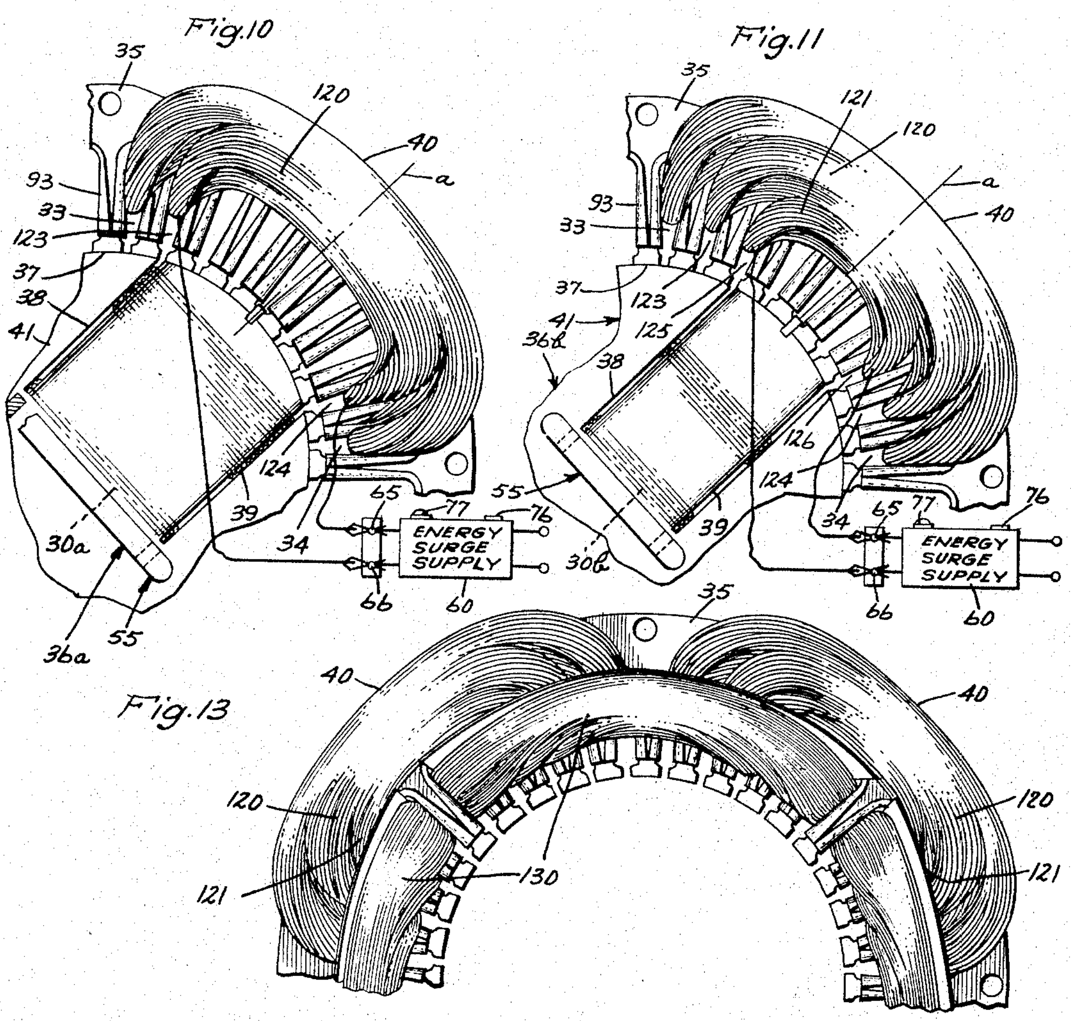
FIG. 10 is a partial end view of the stator core and ejecting device illustrated in FIG. 7, showing the development of conductor convolutions into a second coil for the same coil group as the coil of FIG. 7.
FIG. 11 is a view similar to FIG. 10 showing the development of a third coil in the same coil group.
FIG. 13 is an end view of one half of the finished stator of the exemplification revealing the auxiliary winding arranged in the core.

It will be recalled that for the purpose of disclosing my invention the developed coil 40 of the first exemplification of FIGS. 1–9 is the outermost coil of three concentric coils in a coil group of a distributed type main field winding. FIGURES 10–13 inclusive show how the main field winding for stator core 35, schematically illustrated in FIG. 12 may be completed. In these figures, like parts to those already described in connection with the previous figures, are identified by the same references. FIGURE 10 depicts the development of the intermediate coil 120 from a predetermined number of convolutions 30*a* shown in phantom in the bore of the core carried by device 36*a*. FIGURE 11 shows the development of the innermost coil 121 from convolutions 30*b*. The structural and functional relationships of the parts of devices 36*a* and 36*b* shown in FIGS. 10 and 11 are identical with those in device 36, except that in FIG. 10, channels 38, 39 are aligned with slots 123, 124 disposed angularly inwardly of and next to slots 33, 34 while for FIG. 11, the channels communicate with next adjacent slots 125, 126. As before, short-circuited winding 55 has its side portions located beneath the bottom walls of the channels. Since each of these coils 120, 121 are developed in the identical fashion as outermost coil 40, no further discussion will be set out here in this regard. Suffice it to say that, as seen diagrammatically in FIG. 12, each coil group may be formed by my invention, the coils being suitably interconnected in serial relation as indicated at 127, with leads 128 evidencing interpole connections for the coil groups.

Due to the high degree of compaction and force-back of the end turns attained by the present invention, it is an easy matter to place the well-known between-phase insulators in position on core 35, shown in FIG. 13 and arrange the coils of an auxiliary winding 130 properly in the slots of the stator core.

Figure 12:
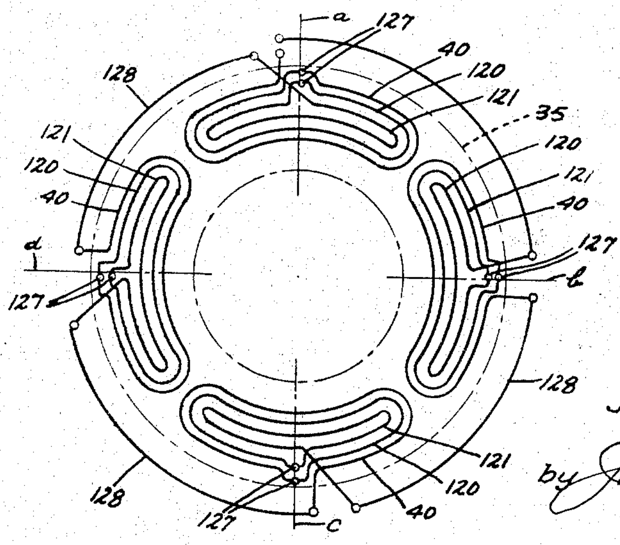
FIG. 12 is a diagrammatic circuit representation of the completed main winding for the stator of the exemplification.
Figure 14:
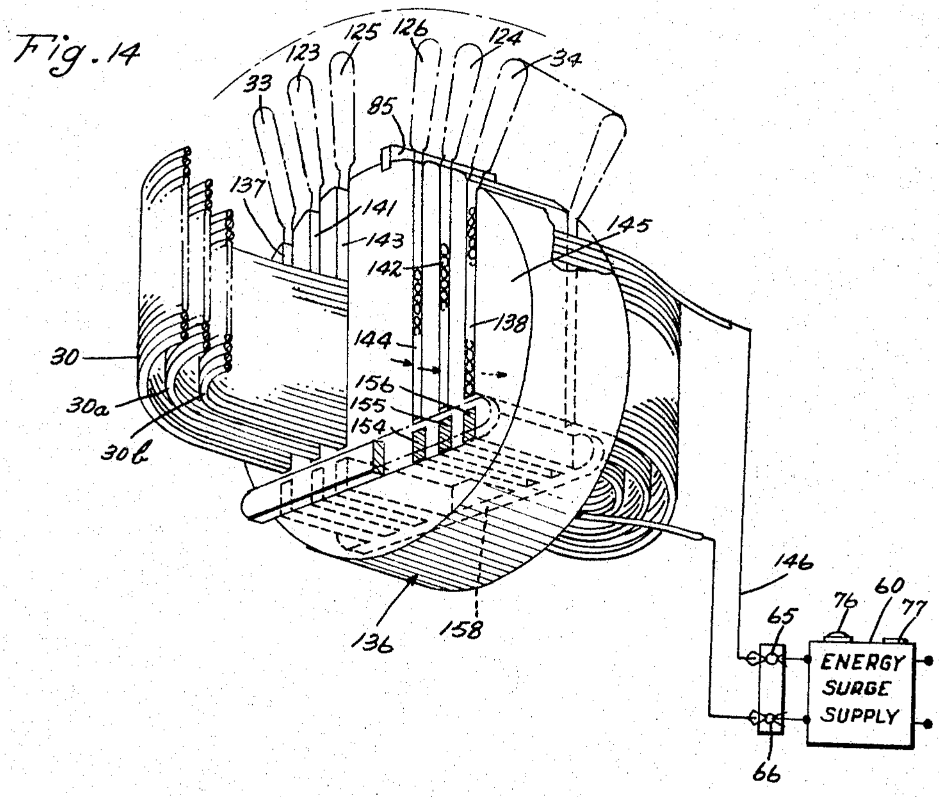
FIG. 14 is a view in perspective partially broken away and partially schematic, depicting the manner in which an entire coil group may be developed concurrently by the present invention, the view showing a modified form of the ejecting device illustrated by FIGS 2–11 inclusive and further showing the circuit connection of the convolutions to the energy surge supply.
Figure 15:
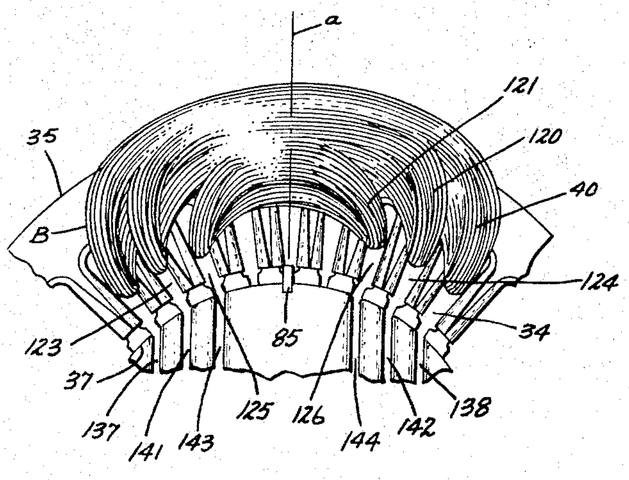
FIG. 15 is a partial end view of the stator core and coil group developed with the apparatus revealed by FIG. 14.

FIGS. 14 and 15 reveal the way in which my invention can be employed to develop all of the coils in a single coil group simultaneously of the distributed winding shown schematically in FIG. 12 by the use of a modified version of the convolution ejector device 36 of the first exemplification. Once again, like parts already described are referenced the same. In FIGS. 14 and 15, the convolution ejector device is denoted by numeral 136 and includes three pairs of channels 137, 138; 141, 142; and 143, 144 formed in cylindrical body member 145 composed of thermo-responsive material. Each pair of channels retains the side portions of serially connected convolutions 30, 30*a*, 30*b* respectively which are formed from a continuous length of insulated conductor wire having terminations 146, 147 connected across the terminal connectors 65, 66 of energy surge supply 60. The channels have the construction outline for channels 38, 39. In the embodiment of device 136, a short-circuited winding 148 formed of suitable electrically conductive material is fixedly carried by member 145 beneath the channels. The winding includes a side section for each channel 151–156 inclusive, electrically joined together at each end by transverse sections 157, 158.

The convolutions 30, 30*a*, 30*b* are simultaneously ejected from device 136, introduced into their associated slots and developed into coils 40, 120, and 121 by the generation of at least one energy surge in the convolutions of preselected magnitude from supply 60 after the channels have been properly aligned with their respective slots. The energy surge provides a surge of current flow through the convolutions in the same direction, as indicated by the arrows in FIG. 14, inducing an opposed current flow through the winding side sections. The opposed current flows create opposed magnetic fields which react to produce forces acting upon the individual convolution side portions in the channels for transferring them into the slots and developing the convolutions into coils 40, 120, and 121 as previously outlined and according to my present understanding of the phenomena. The developed coils and their compacted and forced-back end turns are shown in FIG. 15.

In the development of the other three coil groups, device 136 may be removed from the bore 37 of the core, convolution terminations 146, 147 disconnected from the energy surge supply 60 and other convolutions placed into the channels of member 145. A standard indexing mechanism may be used to turn the device and the stator core relative to one another so that the device will be in the correct angular position to develop the next coil group. This procedure is especially advantageous in view of the efficient and rapid fashion in which a complete winding can be developed and the small number of connections needed to place the winding coils in circuit with each other.

Figures 16, 17:
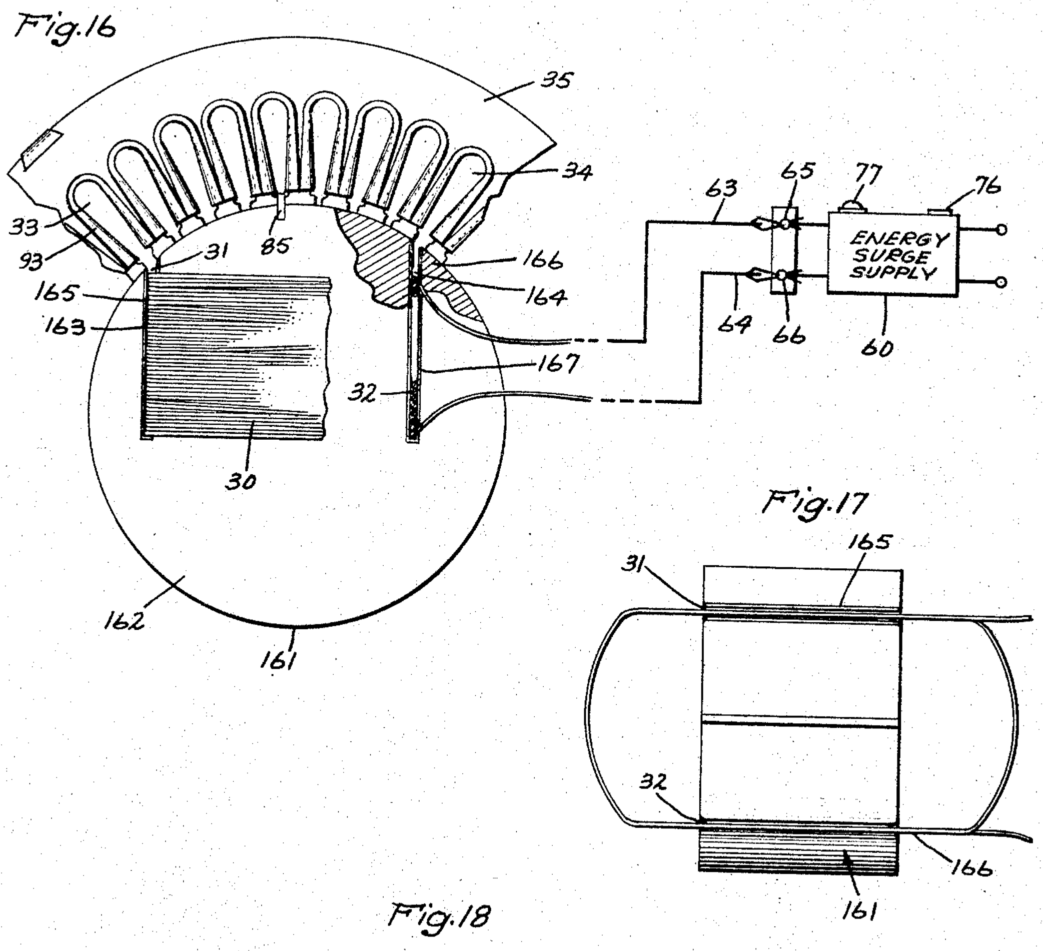
FIG. 16 is an end elevational view, partly broken away, of yet another form of a convolution ejecting device which may be employed in the practice of the present invention, with the device carrying conductor convolutions in series circuit to the energy surge supply and being positioned for introduction of the convolutions into preselected slots of a stator core, partially shown.
FIG. 17 is a plan view of the ejecting device shown in FIG. 16, revealing the device with conductor convolutions disposed therein prior to the placement of the device into the stator core seen in FIG. 16.

FIGS. 16 and 17 show another version of the convolution ejector device, referenced at 161, of my improved apparatus in connection with the development of coil 40 for stator core 35. In this modification, cylindrical member 162 is formed of rigid non-magnetic, electrically conductive material for conducting transient eddy current flow in opposition to the current flow through the convolutions 30 during their excitation, rather than short circulated winding 55 of the first exemplification. A pair of separated channels 163, 164 retain the convolutions and like channels 38, 39, have their upper ends or regions 165, 166 adapted to guide the convolution side portions 31, 32 individually into preselected slots 33, 34. To electrically insulate the convolutions from the walls of the channels for preventing potential grounds and arcs therebetween, suitable electrical insulation, such as polyethylene terephthalate sheet material 167. In actual practice, it has been discovered that, as compared with device 36 using short circuited winding 55, the dimensions for channel regions 165, 166 are far more actual than in device 36 and that the convolutions have a tendency to vibrate or chatter as momentum is imparted to them away from the sections of member 162 directly beneath the channels.

Figure 18:
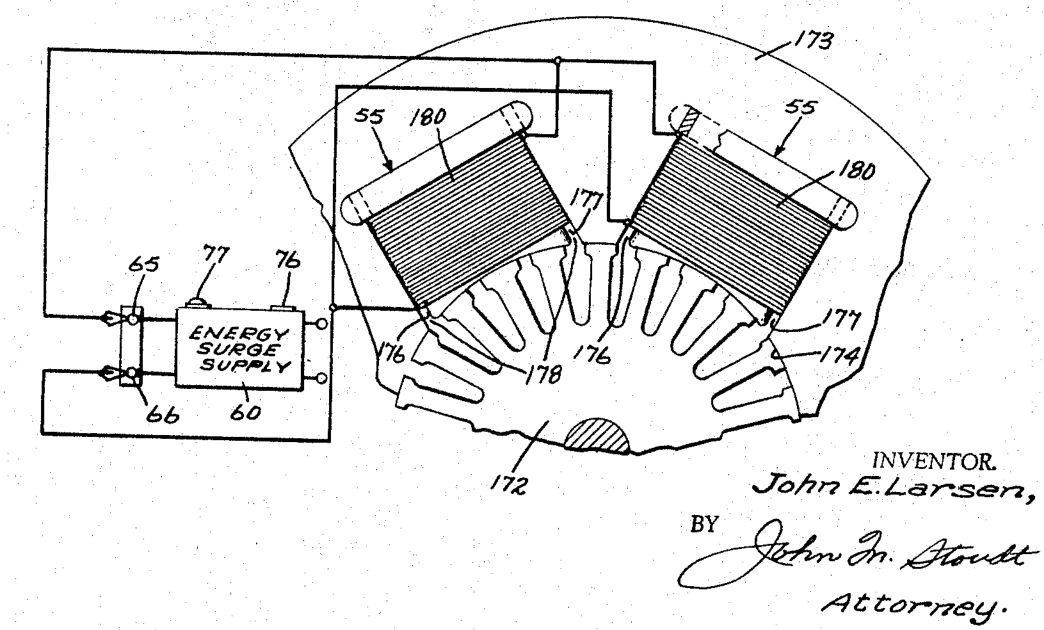
FIG. 18 is an end elevational view, partly in cross section and schematic, showing the introduction of electrical convolution into the slots of an armature or the like in accordance with another embodiment of the present invention.

In FIGURE 18, among other things, the versatility of the method of my invention is demonstrated by its application to the development of coils accommodated in the slots 171 of a wound armature core 172 partially shown in that figure. A thermoresponsive annular member 173, having a central bore 174 for receiving core 172 is furnished with a number of pairs of channels 176, 177 which communicate with entrances 178 for preselected slots of core 172. Each pair of channels 176, 177 retains suitable insulated convolutions 180, 180*a* which are connected in parallel circuit with each other but serially across output connectors 65, 66 of energy surge supply 60. By placing convolutions 180, 180*a* in parallel, the voltage requirements are reduced for a given level of force. Short circuited winding 55 is employed next to the bottom walls of the sets of channels similar to that in device 36 of the first exemplification. Since the development of convolutions 180, 180*a* into coils of the desired configuration corresponds essentially to that for convolutions 30 already outlined in regard to the first exemplification, no further description will be set out here.

Referring now to FIGURES 19, 20, and 21, I have shown another embodiment of the method of my invention and a further variation of the apparatus for practicing it. For the purpose of explanation, stator core 35 of the first exemplification is employed and concentric coils 40, 120, and 121 of the coil group having its radial polar center at *a* on the stator core are simultaneously developed from the serially connected and continuously wound convolutions 30, 30*a*, and 30*b* respectively shown in phantom at their original positions A in the bore of the core.

The illustrated ejector device, generally indicated by numeral 186, for the apparatus of this embodiment, includes the thermoresponsive cylindrical member formed with three sets of channels to retain the side portions of the convolutions and is identical in construction to member 145 illustrated in FIGURES 14 and 15. Thus, in the FIGURES 19, 20 and 21, like parts are designated by like reference numerals.

Device 186 differs principally from device 145 of FIGURES 14 and 15 in that it fixedly mounts an excitation winding 197 having its terminations 188, 189 in circuit across terminal connectors 55, 56 of the energy supply 60 in the place of shorted winding 148 of FIGURE 14. Winding 197 may be formed from a number of turns of conductor wire concentrically arranged beneath the bottom walls of the slots in the manner of side sections 151 through 156 inclusive of short-circuited winding 148. The winding sides of winding 187 are indicated by numerals 191 through 196 in FIGURES 19 through 21. Like the embodiment of FIGURE 14, the end turn sections of winding 197 are disposed next to the respective side faces of member 145 for the same reasons. The individual conductor turns for winding 187 are embedded in epoxy resin or other suitable hardened dielectric adhesive material which fixedly attaches the winding turns to cylindrical member 186 best seen in FIG. 20.

The method revealed in FIGURES 19 through 21 is primarily distinguishable from that described in the first exemplification in that a flow of current is generated in convolutions 30, 30*a*, 30*b* in initial positions A as they are retained by device 186 by the direct application of an electrical energy surge to winding 187 rather than to the convolutions.

It will be observed from FIGURE 19 that the terminations 146, 147 of convolutions 30, 30*a*, 30*b* are electrically joined together, indicated at 198, to provide a closed path through the convolutions and are, in effect, in short circuit relation. Consequently, with winding 187 disposed below the shorted convolutions when they are retained by device 186 in the proper positions relative to preselected slots 33, 34; 123, 124; and 125, 126; a surge of current flow applied to winding 187 will induce an opposed transient current flow in the convolutions.

A high energy surge may be injected into winding 187 by depressing the pushbutton of the pushbutton switch 77 to first charge, then discharge the capacitor bank of supply 60. The resulting relative direction of opposed current flows is depicted in FIGURES 19, 20, and 21 by arrows and the standard symbols. The opposed current flows, in turn, establish varying magnetic fields which, together with the currents, interact to produce electromagnetic forces acting upon the individual conductor convolution side portions in the channels of member 41 in a direction generally toward their preselected slots. The convolutions are repelled away from winding 187, as indicated by arrows 199 in FIGURE 19, and are guided by the copper regions of the respective channels through the restricted slot entrances and into the preselected slots. The convolutions are developed into coils 40, 120, and 121 in the manner already outlined in the other exemplifications and are ultimately driven into their final positions B.

If desired, additional energy surges may be applied across the primary winding of sufficient magnitude to achieve a desired final configuration for the coils. The force level which must be produced on the convolutions to effect the desired compaction and contouring of the convolutions and to develop them into coils having the desired configuration, is dependent on the factors presented in connection with the first exemplification.

The embodiment of my invention just described for FIGURES 19, 20, and 21 has the same advantages suggested before regarding the other exemplification. However, in the latter embodiment a further benefit results from the induced current flow in the convolutions, since the convolution turn to turn voltage may be reduced over that for the first exemplification where the surge of current flow is generated in the convolutions by direct application of energy to the convolutions.

It will be apparent from the foregoing descriptions that my invention provides many benefits and advantages. For example, conductor convolutions may be efficiently and economically developed into electrical coils of the desired configurations without the need for expensive equipment. In addition, the conductor insulation will not be deleteriously affected since no mechanical members are required which physically contact and force the convolutions into the convolution accommodating structure. It will be further appreciated that although the illustrated exemplifications of my invention were in connection with dynamoelectric machine cores, and has particular significance when used to develop coils with these cores, it can be advantageously employed to introduce electrical conductors into other conductor accommodating structures. For instance, my invention may be used to introduce electrical conductors into electromagnetic and electrical inductive devices where it is desirable to transfer the conductors into the conductor accommodating structure from a location outside that structure.

It should be apparent to those skilled in the art, while I have shown and described what at present is considered to be the preferred embodiments of my invention in accordance with the patent statutes, changes may be made in the disclosed embodiments without actually departing from the true spirit and scope of this invention, and I therefore intend to cover in the following claims all such equivalent variations as fall within the invention.

What I claim as new and desire to secure by Letters Patent of the United States is:

1. A method of inserting portions of a number of serially connected movable convolutions of first electrical conductive means into preselected slots of a dynamoelectric machine magnetic core and developing the convolutions into a number of coils comprising the steps of: arranging portions of the serially connected movable convolutions in communication with the entrances of the preselected slots and in the vicinity of second electrically conductive means; applying a surge of electrical energy to at least one of said electrically conductive means thereby producing current flow in said at least one of said electrically conductive means thereby to establish a magnetic field and cause opposing reaction between said first and second electrically conductive means to create forces acting on and to impart momentum to the portions of said convolutions for transferring said portions away from said second electrically conductive means; guiding said portions into their associated preselected slots as said portions are being transferred away from said second electrically conductive means; and developing said convolutions into compacted coils after said portions have been transferred into said preselected slots.

2. A method of inserting portions of a number of continuous, insulated electrical conductor convolutions into angularly spaced apart slots of a dynamoelectric machine stator core, with each convolution being defined by a pair of side and end portions respectively, the method comprising the steps of: disposing the convolution side portions at predetermined initial positions adjacent to and in direct communication with entrances of preselected slots and in the vicinity of electrically conductive material; and effecting transfer of said convolution side portions into desired positions within the preselected slots by generating at least one electrical energy surge of preselected magnitude in the convolutions below the intensity at which the conductor insulation is deleteriously affected to produce current flow in the convolution side portions and interacting flux between the electrically conductive material and said convolution side portions to cause forces acting upon at least the convolution side portions while guiding said side portions toward their associated slot entrances, with the forces effecting the transfer of said side portions from their respective predetermined initial positions, through the associated slot entrances, and into the desired positions within said preselected slots.

3. A method of introducing a series of side portions of insulated electrically conducting convolutions into preselected angularly spaced apart slots extending axially between a pair of end faces of a dynamoelectric machine stator core and developing the convolutions into a compacted coil, the method comprising the steps of: disposing individually movable convolution side and end portions at predetermined initial positions within the bore of the core and adjacent electrically conductive material, with the convolution side portions being located in communication with entrances of preselected slots, and with the end portions projecting axially beyond the end faces of the core, while establishing communicating paths between said initial positions of the convolution side portions and their associated slot entrances; generating at least one electrical energy surge of preselected magnitude in the convolutions below the intensity at which the conductor insulation is deleteriously affected to produce repulsion forces acting upon the convolution side portions by virtue of an interaction of at least one current surge in the electrically conductive material and the convolution side portions and a magnetic field established in the vicinity of the convolution side portions, and imparting movement as a result of the repulsion forces to the convolution side portions from their respective initial positions, through the established paths, and associated slot entrances and into said preselected slots; and developing the convolutions into a compacted coil as the at least one electrical energy surge is being generated in the convolutions by constraining further movement away from said initial positions of the convolution side portions within the slots and by continued movement of said convolution end portions radially beyond the side portions of the same convolution and axially toward the associated core end faces thereby forcing the convolution end portions away from the bore.

4. A method of inserting movable convolutions of a coiled electrical conductor into preselected slots of a magnetic core comprising the steps of: establishing communicating alignment between portions of the convolutions and entrances of the preselected slots, and positioning an electrical winding adapted to provide a closed electrically conductive path in the vicinity of the convolution portions; applying at least one surge of electrical energy to the coiled electrical conductor, with the at least one electrical energy surge creating a force reaction between said electrical winding as it provides the closed electrically conductive path and the electrical conductor as a result of interacting currents and magnetic field produced by the at least one electrical energy surge thereby imparting momentum to convolutions away from said electrical winding; and guiding the convolution portions into the preselected slots as the portions travel away from said electrical winding providing the closed electrically conductive path by virtue of the force reaction.

5. A method of inserting movable convolutions of a coiled electrical conductor into preselected slots of a magnetic core comprising the steps of: positioning the convolutions between entrances of the preselected slots and rigid electrically conductive winding means, and establishing confined paths communicating between portions of the convolutions and the associated entrances of the respective preselected slots; and applying at least one surge of electrical energy to the winding means as the convolutions form a closed circuit, with the at least one electrical energy surge generating a flow of current in the short-circuited convolutions to cause a magnetic field and opposing force reaction between the closed circuit convolutions and winding means such that the convolutions are transferred away from the winding, through the confined paths, and into the preselected slots.

6. A method of introducing at least one electrical conductor into electrical conductor accommodating means comprising the steps of: arranging at least one individually movable conductor and conductor accommodating means in direct communication with one another, with electrically conductive material being in the vicinity of said at least one electrical conductor; and introducing said at least one electrical conductor into said conductor accommodating means by generating at least one electrical energy surge of preselected magnitude in the at least one electrical conductor thereby establishing magnetic fields and active forces interacting between the electrically conductive material and the at least one electrical conductor to produce movement of the at least one electrical conductor in a direction generally toward said conductor accommodating means, with the active forces effecting transfer of the at least one electrical conductor into said conductor accommodating means.

7. A method for introducing a movable first electrically conductive member formed of a number of continuous convolutions into convolution accommodating means and for developing the convolutions into a coil comprising the steps of: arranging portions of the convolutions in predetermined positions with respect to the convolution accommodating means and to a second electrically conductive member; applying a first surge of electrically energy of predetermined magnitude to at least one of the electrically conductive members, with the energy surge producing interacting currents in said electrically conductive members and magnetic fields which create repulsion forces acting upon the said first electrically conductive member; guiding the convolution portions toward the accommodating means as the repulsion forces effect transfer of the convolution portions away from the second electrically conductive member and into the accommodating means; and applying at least a second surge of electrical energy of a predetermined magnitude to at least one of said electrically conductive members for creating current flow and a magnetic field in at least said first electrically conductive member to cause forces acting on said first electrically conductive member to develop the convolutions thereof into a coil having a desired contour.

8. A method of introducing a movable electrically conductive member formed of a number of continuous convolutions into convolution accommodating means comprising the steps of: arranging portions of the convolutions in predetermined positions with respect to the convolution accommodating means and to a rigid electrically conductive member; applying an electrical surge of energy to at least one of the electrically conductive members, with the electrical energy surge causing current flows in said electrically conductive members and magnetic fields in the regions of said members thereby creating a reaction between said rigid electrically conducting member and said movable electrically conductive member to produce forces acting directly upon the movable electrically conductive member; and guiding the convolution portions toward the accommodating means as the forces effect rapid transfer of the convolution portions away from the rigid electrically conductive member and into the accommodating means.

9. A method of introducing a number of movable convolutions of a first electrically conductive member into preselected slots of a slotted structure comprising the steps of: disposing portions of the first electrically conductive member in predetermined positions relative to preselected slots of the structure and to a second electrically conductive member, with a confined path being established between the portions and the preselected slots; and introducing the portions of said first electrically conductive member into said preselected slots by generating a surge of electrical energy in the convolutions such that current flow is produced in said electrically conductive members and magnetic fields established in the region of said portions of the first electrically conductive member, thereby causing repulsion forces to act upon the portion and impart momentum thereto for transferring the portions along said confined path and into the preselected slots.

10. A method of introducing a movable electrically conductive member formed of a number of continuous convolutions into convolution accommodating means comprising the steps of: arranging the portions in predetermined positions with respect to rigid electrically conductive winding means; establishing a confined and aligned path between portions of the convolutions and entrances to the convolution accommodating means; and effecting an introduction of said portions of the convolutions into said convolution accommodating means by applying a surge of electrical energy of predetermined magnitude to the winding means, with the electrical energy surge causing current flow in said winding means and said portions of the convolutions and a magnetic field in the region of said portions to produce repulsion forces acting upon the movable electrically conductive member; and guiding the convolution portions toward the entrances of the accommodating means as the repulsion forces effect transfer of the convolution portions away from the winding means and into the accommodating means.

References Cited

UNITED STATES PATENTS

| | | | |
|---|---|---|---|
| 2,377,175 | 5/1945 | Peer | 318—220 |
| 2,506,173 | 5/1950 | Polard | 29—205 |
| 2,691,306 | 10/1954 | Beams et al. | 310—166 |
| 2,976,907 | 3/1961 | Harvey | 153—10 |
| 3,092,165 | 6/1963 | Harvey | 153—2 |
| 3,115,857 | 12/1963 | Pfanner | 113—44 |

OTHER REFERENCES

Furth et al.: Scientific American vol. 198, February 1958, pp. 28–33.

Seely: Introduction to Electromagnetic Fields, 1958, McGraw-Hill, pp. 269–274.

Moulin: The Principles of Electromagnetism, 2nd edition, 1950, Oxford at the Clarendon Press, pp. 234 and 235.

Crow: Design, Construction and Operating Principles of Electromagnets for Attracting Copper, Aluminum and Other Non-Ferrous Metals, 1951, The Scientific Book Publishing Co., p. 22.

Geary: Magnetic and Electric Suspensions; 1964, SIRA Research Report R314, pp. 61–65.

JOHN F. CAMPBELL *Primary Examiner.*

J. L. CLINE, *Assistant Examiner.*

UNITED STATES PATENT OFFICE
CERTIFICATE OF CORRECTION

Patent No. 3,333,327 August 1, 1967

John E. Larsen

It is hereby certified that error appears in the above numbered patent requiring correction and that the said Letters Patent should read as corrected below.

Column 4, line 15, for "nows" read -- now --; column 7, line 12, for "should" read -- could --; column 9, line 21, for "500" read -- 5000 --; column 11, lines 52 and 53, for "circulated" read -- circuited --: column 15, line 49, for "electrically" read -- electrical --.

Signed and sealed this 27th day of May 1969.

(SEAL)
Attest:

Edward M. Fletcher, Jr.
Attesting Officer

William E. Schuyler, Jr.
Commissioner of Patents